June 22, 1926.
C. S. TEITSWORTH
1,590,132
HEAT INSULATING COMPOSITION AND PROCESS OF MAKING THE SAME
Filed August 12, 1924
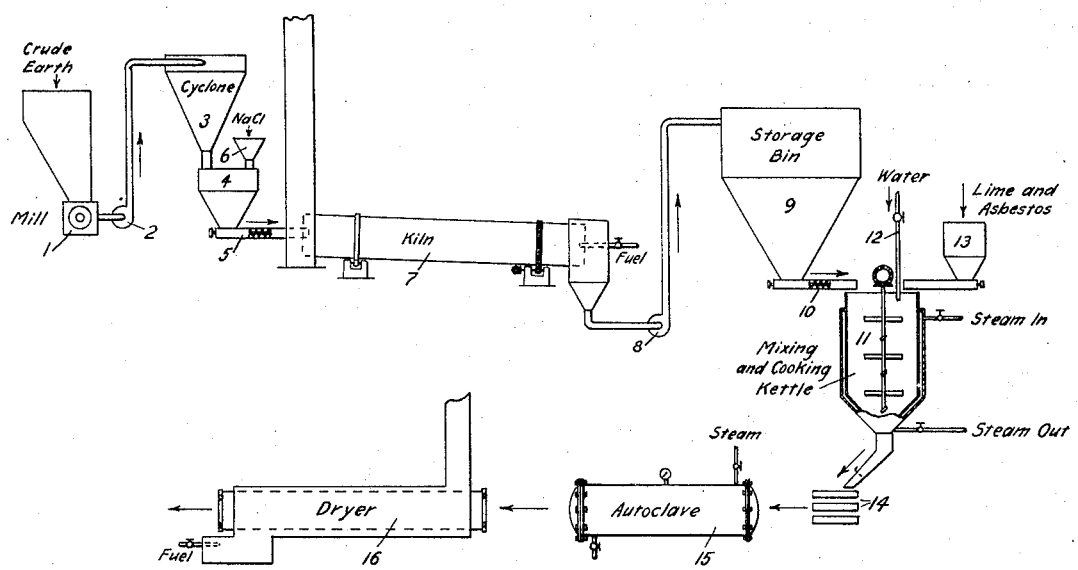
INVENTOR.
Clark S. Teitsworth
BY Arthur P. Knight
ATTORNEY.

Patented June 22, 1926.

1,590,132

UNITED STATES PATENT OFFICE.

CLARK S. TEITSWORTH, OF LOMPOC, CALIFORNIA, ASSIGNOR TO THE CELITE COMPANY, OF LOS ANGELES, CALIFORNIA, A CORPORATION OF DELAWARE.

HEAT-INSULATING COMPOSITION AND PROCESS OF MAKING THE SAME.

Application filed August 12, 1924. Serial No. 731,631.

The present invention provides a novel method or process of manufacturing a heat insulating product in the form of blocks, pipe covering or other moulded shapes which may be used as a heat retaining medium around steam pipes, heated tanks, boilers, furnaces and all other forms of equipment from which heat may be dissipated into the atmosphere and lost. The invention also provides a novel heat insulating material of high efficiency having refractory as well as heat insulating properties and at the same time those qualities which give permanency, light weight, freedom from disintegration, shrinkage and spalling at high temperatures and a resistance against the penetration of moisture therein.

Of the many materials used in the manufacture of heat insulating compositions, magnesium carbonate and diatomaceous earth have been most generally adopted. Compositions containing magnesium carbonate have several disadvantages, namely the block or form made therefrom, shrinks and checks badly at temperatures above 1000° F. so that almost complete disintegration takes place, accompanied by a large loss in weight. Diatomaceous earth is a most efficient heat resisting and insulating material, and many methods of binding the particles of such earth to obtain the desired strength without reducing the heat insulating properties have been tried.

Diatomaceous earth, known as kieselguhr, fossil flour, infusorial earth, or tripoli, is composed of amorphous silica together with small amounts of clay and lime. The amorphous silica comprising from 70 to 96 per cent, approximately, of the material, contains from 5 to 15 per cent combined water, which is slowly driven off when the earth is heated up to temperatures of 1400°. In my present invention, I utilize the microscopic, porous structure of the diatomaceous earth, but remove therefrom the combined water so that loss in weight is reduced to a minimum if the finished material should be heated during use to temperatures of 1400° or above.

Heretofore when diatomaceous earth has been used as a basis for heat insulating compositions bonded together with lime, magnesium carbonate, gypsum or other materials, the loss of combined water when the finished blocks were exposed to high temperatures caused rupture of the blocks and great loss in strength. By removing this combined water, in accordance with my invention, from the diatomaceous earth before it is bonded with small amount of a suitable binder, it is possible to manufacture a block having excellent heat insulating properties and eliminate loss in strength which usually developed when these blocks were heated to 1000° and above.

It has been well known that silica and lime in the presence of steam at a pressure of approximately 100 to 150 pounds, will combine to form a calcium silicate, resulting in a hard and horny mass, having a high crushing strength. This has been utilized in the manufacture of sand-lime brick and other structural materials and also in the manufacture of heat insulating blocks made from natural diatomaceous earth. Blocks made in accordance with my invention from diatomaceous earth which has been previously calcined to temperatures above 1400° exhibit markedly different physical properties, due to the fact that the combined water of the diatomaceous earth has been removed and this is one feature of the invention.

In carrying out my invention, diatomaceous earth is first disintegrated or milled so as to produce a powdered product, which is then charged into a furnace operating at temperatures from 1400° F. to a temperature of incipient fusion of such earth. The temperature used for the calcination will vary somewhat according to the character of the diatomaceous earth being used, that is upon its purity and freedom from clay or lime and upon the conditions to which the finished block will be subjected. The calcining furnace may be of any convenient type, although I have found that a rotary kiln through which the material is fed counter-current to the flame, may be very effectively utilized. After calcination, the resultant porous silica may be disintegrated a second time, if necessary, so as to break up any lumps which may be formed during calcination, such lumps being very friable and easily broken up between the fingers. The result of such calcination consists substantially of finely divided porous calcined silica retaining substantially the structure, form and porosity of the original diatomaceous earth, but is notably distinct in its properties from natural diatomaceous earth, as such porous calcined silica is substantially anhydrous and is free from shrinkage upon heating to high temperatures.

To further enhance the qualities of the ultimate product of the process, i. e., the moulded product, and increase its resistance to absorption of moisture, I preferably calcine the disintegrated diatomaceous earth in the presence of a salt of an alkali forming metal, such as sodium chloride, calcium chloride, magnesium chloride, borax, sodium nitrate, or other chlorides or halides of any alkali metal or alkaline earth metal. The diatomaceous earth and sodium chloride or other salt, may be interground or they may be separately ground and then mixed, or a part of same may be interground and then mixed with powdered diatomaceous earth. The sodium chloride or other salt used may be dissolved in water and the diatomaceous earth wetted with the solution and then ground, or the solution may be sprayed on the powdered diatomaceous earth just before calcination. The calcination may take place in any suitable furnace such as a muffle furnace of a rotary kiln at temperatures between 1400 and 2300°, depending upon the character of the salt used and other factors enumerated above. The amount of salt or other chemical used may vary from 2 to 15 per cent by weight of the diatomaceous earth. Without attempting to define the exact nature of the change that is effected in the diatomaceous earth by calcining it in the presence of a salt of an alkali forming metal, it may be said that one advantage is that the finer or dust particles in the diatomaceous earth are sintered, but not in a solid mass, the resultant product of such calcination being a powdery, porous calcined silica. When sodium chloride is used for example it diffuses throughout the porous mass of diatomaceous earth so as to produce a sodium silicate and, in the presence of moisture a small amount of hydrochloric acid, which is driven off with the gases of combustion. Similarly when other salts are used corresponding reactions occur with a portion of the silica, and in the case of any salt of an alkali-forming metal capable of reacting with the silica to form a silicate at the temperature of calcination a silicate of such metal is formed as one of the reaction products. The sodium silicate or other silicate so produced probably coats the particles of diatomaceous earth, and gives them a certain water repellent property, as well as an increase in strength, which is particularly noticeable in the finished heat insulating blocks.

In further carrying out the invention from 60 to 85 per cent by weight of the porous calcined silica, prepared from raw diatomaceous earth as above described is mixed with from 3 to 12 parts of water, by weight, in a tank provided with suitable agitating means. For this purpose I may use porous calcined silica prepared by calcination of diatomaceous earth alone, or by calcination of such earth in the presence of a salt of an alkali forming metal, or I may use a mixture of materials prepared in both the above ways. From 5 to 45 per cent of lime, either quicklime or hydrated, is then added and the agitation continued; and when the mixture has reached a homogeneous composition from 2 to 15 per cent of asbestos fiber is added. It is preferable to heat the mixture during the mixing operation, and I prefer to mix the ingredients in a steam jacketed kettle; and by using quicklime the heat is enhanced by the slaking of the lime; the composition resulting from a hot mixture exhibits markedly different physical characteristics from a composition of a cold mixture of like ingredients.

By mixing the lime, calcined finely divided porous silica and fiber in hot water, the reaction between the lime and silica takes place very much more rapidly and forms a calcium hydro-silicate, and an increase in volume takes place, which materially reduces the weight per cubic foot of the final product, and this property appreciably enhances the practical success of my invention. The increase of volume mentioned above is very apparent and laboratory results have shown that a mixture of lime and calcined porous silica after cooking in hot water for a short time and then allowing to settle, will occupy two to four times the volume of the same mixture of lime and diatomaceous earth settled in cold water.

After the above described mixture has been thoroughly agitated and heated for the required time in the agitating tank, the slurry or mass is shaped in suitable moulds, and the moulds then transferred to a steam autoclave or indurating chamber where they are subjected to the action of steam at from 75 to 150 pounds for a period of about six hours. The indurated blocks or bodies are then removed from the moulds and dried, preferably by artificial heat, in a suitable dryer.

In order to accentuate the water repellent property of the blocks, I may utilize the priming effect of red oil, calcium stearate, casein, animal or vegetable glues, aluminum sulphate or other suitable materials, which can be added to the ingredients during the mixing process above described.

Heretofore blocks have been waterproofed by coating the surfaces of the finished block or moulded article with a tar or other waterproofing substance, but to my knowledge no one has ever disclosed the process of incorporating a waterproofing agent and distributing the same throughout the entire mass of a heat insulating block.

In the at present preferred method I calcine the raw powdered diatomaceous earth at a temperature of about 1800° F. more or less, with the addition thereto of about 5 per cent by weight, of sodium chloride. The resulting calcined porous silica is then mixed hot with 15 per cent quicklime, and 10 per cent asbestos fiber by weight; and with from 3 to 8 parts of water; and the resultant compound when moulded, indurated and dried produces an insulating block which is almost absolutely free from carbon dioxide or carbonates and after exposure to 1600° F. shows only a very small shrinkage; and the thermal conductivity of such insulating block at high temperatures is much below that of blocks now on the market.

By varying the temperature at which the diatomaceous earth is calcined, the amount of water used in the mixing and the temperature at which the mixture is heated while in the agitating tank, heat insulating blocks may be produced varying in density from 12 to 22 pounds per cubic foot. The amount of lime used also affects the weight of the finished block and its strength. I preferably use a long fibered well carded asbestos which increases the strength of the finished block. For some uses, where the heat insulating blocks are not exposed to very high temperatures, a vegetable or animal fiber such as manila fiber or hair may be used as an equivalent or substitute for the asbestos, and in some cases the fibrous material may be dispensed with.

By calcining said diatomaceous earth at temperatures above 1700° F. when it is desirable to do so, I eliminate not only the combined water, but also remove from the raw diatomaceous earth a certain amount of shrinkage which occurs at or about 1600 to 1700° F. The heat insulating blocks so produced have a distinctively high resistance to the disintegrating action of heat and it is possible to produce blocks having substantially no shrinkage at temperatures up to 1800° F.

The equipment necessary for the operation of my invention is indicated in its simplest form on the accompanying drawing. The crude diatomaceous earth in lumps of varying sizes is fed to a suitable disintegrater (1) (a swing hammer mill has been found very effective) and the disintegrated earth is then conveyed, if desired, by means of a suitable fan 2 by pipe means to a cyclone 3 or other separating or screening device, or this operation may be eliminated. The finely divided diatomaceous earth from the separating equipment (when used) is discharged into a small hopper 4 from which it is fed by means of a screw conveyor or other means 5 to a rotary kiln 7 fired from the opposite end. In the rotary kiln the earth is calcined, while in the pulverized condition, to a suitable temperature between 1400 and 2400° F. and the discharged product conveyed by means of fan 8 to a large hopper or bin 9. It has been found that any milling required after calcination of the material may be accomplished by means of a fan of suitable size and make which may be substituted for fan 8. From hopper 9 the now calcined pulverized porous silica is fed by means of a screw conveyor or other means 10 into a steam jacketed kettle 11 equipped with suitable mixing means and with water supplying means 12. Lime in desired amounts is added to the agitating tank 11 from hopper 13 the asbestos fiber being also added at this point. After agitating and thoroughly mixing the composition in the agitating tank the slurry is allowed to flow into moulds 14 which may be of any desired shape or size. While in the moulds immediately after pouring the excess material is scraped off the tops of the moulds and the filled moulds are then sent into the autoclave or steam indurating chamber 15 where they are exposed to the action of steam at from 75 to 150 pounds per square inch to a period of from 2 to 12 hours. After the pressure has been released from the steam chamber the moulds are removed therefrom and the moulded blocks discharged. The blocks are then dried, preferably in a dryer 16 heated to a maximum temperature of about 450° F. by means of combustion gases or other means. The blocks may be trimmed or sawed to true size either before or after drying.

An alternative from the above procedure may consist of the addition of a suitable chemical, preferably a salt of an alkali forming metal, by means of hopper 6 to the diatomaceous earth being fed to the rotary kiln 7. It is also possible to add during mixing of the composition in tank 11 a waterproofing agent such as calcium stearate, aluminum sulphate, casein or an animal or vegetable glue or any other suitable waterproofing material so that the finished blocks will be water resistant not only on the surface, but throughout their entire mass.

I claim:

1. The process of manufacturing porous heat insulating bodies, consisting in calcining disintegrated diatomaceous earth, mixing the resulting calcined porous silica with a binder and water, to form a plastic mass, molding the mass to shape, indurating the molded product, and drying the indurated product.

2. In the process as set forth in claim 1, calcining the diatomaceous earth in the presence of a salt of an alkali forming metal.

3. The process of manufacturing porous heat insulating bodies consisting in calcining disintegrated diatomaceous earth, mixing the resulting calcined finely divided porous silica with lime, fiber, and water to form a plastic mass, molding the mass to shape, indurating the molded product, and drying the indurated product.

4. An article of manufacture comprising about 75 per cent of a porous calcined silica obtained by calcining disintegrated diatomaceous earth; 15 per cent lime; 10 per cent asbestos fiber.

5. A process of making a heat insulating composition which comprises mixing calcined powdered porous silica containing solid sodium silicate formed in situ, with lime and asbestos fiber in the presence of water molding the mixture and indurating the mixture by steam under pressure.

6. The process of making a heat insulating composition which comprises calcining disintegrated diatomaceous earth in the presence of a sodium salt capable of reacting therewith to form sodium silicate at the temperature of calcination, thereby causing the formation of sodium silicate on the particles of diatomaceous earth, mixing the calcined material containing such sodium silicate with lime and asbestos fiber in the presence of water and indurating the mixture by steam under presssure.

7. A heat insulating composition having water proof properties and substantially free from shrinkage on heating, containing particles of porous silica together with a solid silicate of an alkali forming metal, formed on the silica particles by subjecting the same to calcination in the presence of a salt of such metal capable of reacting with the silica at the temperature of calcination to form a silicate.

8. A heat insulating composition consisting of the product obtained by calcining finely divided diatomaceous earth in the presence of a salt of an alkali forming metal capable of reacting at the temperature of calcination to form a silicate of such alkali-forming metal on the particles of diatomaceous earth, mixing the product of such calcination with lime and asbestos fiber in the presence of water and indurating the mixture by steam under presssure.

In testimony whereof I have hereunto subscribed my name July, 1924.

CLARK S. TEITSWORTH.